(12) United States Patent
Jones et al.

(10) Patent No.: US 10,459,110 B2
(45) Date of Patent: Oct. 29, 2019

(54) FLEXIBLE CONDUCTIVE SHIELD FOR DOWNHOLE ELECTROMAGNETIC NOISE SUPPRESSION

(71) Applicant: Baker Hughes, a GE company, LLC, Houston, TX (US)

(72) Inventors: Allan R. Jones, Spring, TX (US); Fei Le, Houston, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 294 days.

(21) Appl. No.: 15/642,831

(22) Filed: Jul. 6, 2017

(65) Prior Publication Data

US 2018/0011213 A1  Jan. 11, 2018

Related U.S. Application Data

(60) Provisional application No. 62/360,030, filed on Jul. 8, 2016.

(51) Int. Cl.
*G01V 3/30* (2006.01)
*E21B 47/01* (2012.01)
*G01V 3/28* (2006.01)

(52) U.S. Cl.
CPC .............. *G01V 3/30* (2013.01); *E21B 47/01* (2013.01); *G01V 3/28* (2013.01)

(58) Field of Classification Search
CPC ...................................................... G01V 3/30
See application file for complete search history.

(56) References Cited

U.S. PATENT DOCUMENTS

| 9,790,787 | B2* | 10/2017 | Parker | E21B 47/01 |
| 2005/0056421 | A1* | 3/2005 | Homan | G01V 11/005 |
| | | | | 166/254.2 |
| 2005/0212520 | A1* | 9/2005 | Homan | G01V 3/30 |
| | | | | 324/338 |
| 2006/0065394 | A1* | 3/2006 | Clark | G01V 3/30 |
| | | | | 166/254.2 |
| 2006/0284975 | A1* | 12/2006 | Clark | E21B 47/0002 |
| | | | | 348/85 |
| 2009/0025982 | A1* | 1/2009 | Hall | E21B 17/1078 |
| | | | | 175/76 |
| 2015/0152723 | A1* | 6/2015 | Hay | E21B 47/01 |
| | | | | 175/17 |

* cited by examiner

*Primary Examiner* — Christopher E Mahoney
(74) *Attorney, Agent, or Firm* — Mossman, Kumar & Tyler, P.C.

(57) ABSTRACT

Methods, systems and devices for evaluating an earth formation, including an electromagnetic (EM) well logging apparatus for investigating a formation from a fluid-filled borehole intersecting the formation. Apparatus include a carrier body having a pocket formed in an outer surface, the pocket being defined by a plurality of walls and a bottom; a pad configured to emit EM energy, the pad having an outer face, a plurality of sides complementary to the plurality of walls, and an inner face positioned adjacent to the bottom, wherein the pad is movably disposed in the pocket such that a gap separates at least one wall of the plurality of walls and at least one side of the plurality of sides; and at least one electrically conductive member forming an electrical connection between the carrier body and the pad and covering the gap. The pad may be slideably disposed in the pocket.

15 Claims, 15 Drawing Sheets

FLEXIBLE CONDUCTIVE SHIELD FOR DOWNHOLE ELECTROMAGNETIC NOISE SUPPRESSION

CROSS-REFERENCE TO RELATED APPLICATIONS

This application claims priority from U.S. Provisional Application Ser. No. 62/360,030 filed on Jul. 8, 2016, the entire disclosure of which is incorporated herein by reference in its entirety.

FIELD OF THE DISCLOSURE

This disclosure generally relates to exploration and production of hydrocarbons involving electromagnetic (EM) investigations of regions of an earth formation penetrated by a borehole. More specifically, the disclosure relates to interpretation of measurements of an earth formation using an EM emitting logging tool in a borehole.

BACKGROUND OF THE DISCLOSURE

Electrical earth borehole logging is well known and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The measured responses are affected by properties of the earth formation including electrical conductivity, magnetic permeability, dielectric permittivity and the pore volume or porosity of the rock matrix and water saturation. Resistivity imaging tools have been in widespread use for several years for obtaining resistivity images of walls of boreholes drilled in an earth formation.

The dielectric constant of the formation may be estimated by transmitting an electromagnetic (EM) wave into the formation, and receiving it at one or more receivers (e.g., at receiver antennas). Then, the attenuation and phase shift between the received signals and the transmitted signals are determined, which are used to estimate the dielectric constant of the formation. Alternatively, the attenuation and phase shift between spaced receivers may be used to estimate the dielectric constant of the formation.

By combining complex permittivity measurements with measurements from other borehole devices (e.g., total effective formation porosity), the oil saturation of the formation and resistivity of water can be estimated.

SUMMARY OF THE DISCLOSURE

In aspects, the present disclosure is related to evaluating an earth formation. The evaluation may be carried out using complex dielectric measurements. Aspects include an electromagnetic (EM) well logging apparatus for investigating a formation from a fluid-filled borehole intersecting the formation. Apparatus embodiments include a carrier body having a pocket formed in an outer surface, the pocket being defined by a plurality of walls and a bottom; a pad configured to emit EM energy, the pad having an outer face, a plurality of sides complementary to the plurality of walls, and an inner face positioned adjacent to the bottom, wherein the pad is movably disposed in the pocket such that a gap separates at least one wall of the plurality of walls and at least one side of the plurality of sides; and at least one electrically conductive member forming an electrical connection between the carrier body and the pad and covering the gap. The pad may be slideably disposed in the pocket.

The pad may include circuitry configured to generate measurement signals responsive to emitted EM energy from the pad. The gap may have sufficient dimensions to produce resonant parasitic electromagnetic signals in the measurement signals from capacitive coupling between the carrier body and the pad. The at least one electrically conductive member may mitigate the capacitive coupling. The capacitive coupling may be sufficiently mitigated such that the measurement signals are substantially free of resonant parasitic electromagnetic signals. At least a portion of the at least one electrically conductive member may bridge the gap where capacitive coupling between the body and the pad substantially affects the measurement signals.

The electrical connection may be formed by sliding galvanic contact between the at least one electrically conductive member and at least one of: i) the at least one wall; and ii) the at least one side. The at least one electrically conductive member may maintain the electrical connection while permitting translational motion of the pad in six degrees of freedom. The electrically conductive member may cover a majority of the gap. The at least one electrically conductive member may be a flexible conductive strip.

A first gap may separate a first wall of the plurality of walls and a first side of the plurality of sides, a second gap may separates a second wall of the plurality of walls and a second side of the plurality of sides, and the least one electrically conductive member may include a first member that covers the first gap and a second member that covers the second gap.

The fluid filling the borehole may have a resistivity significantly greater than the electrically conductive member. The electrically conductive member may be a resilient member configured to apply a spring force to the pad. The electrically conductive member may be configured to frictionally engage at least one of: (i) the carrier body, and (ii) the pad. The tool may be configured to radially extend the pad toward a wall of the borehole. Dimensions of the gap may vary during operation of the apparatus.

Method aspects may include generating measurement signals responsive to emitted EM energy from the pad on a carrier body, wherein a gap between the pad and the body has sufficient dimensions to produce resonant parasitic electromagnetic signals in the measurement signals from capacitive coupling between the carrier body and the pad. Methods may include mitigating the capacitive coupling with at least one electrically conductive member. The capacitive coupling may be sufficiently mitigated such that the measurement signals are substantially free of resonant parasitic electromagnetic signals. Methods may include placing at least a portion of the at least one electrically conductive member such that the member bridges the gap where capacitive coupling between the body and the pad substantially affects the measurement signals.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
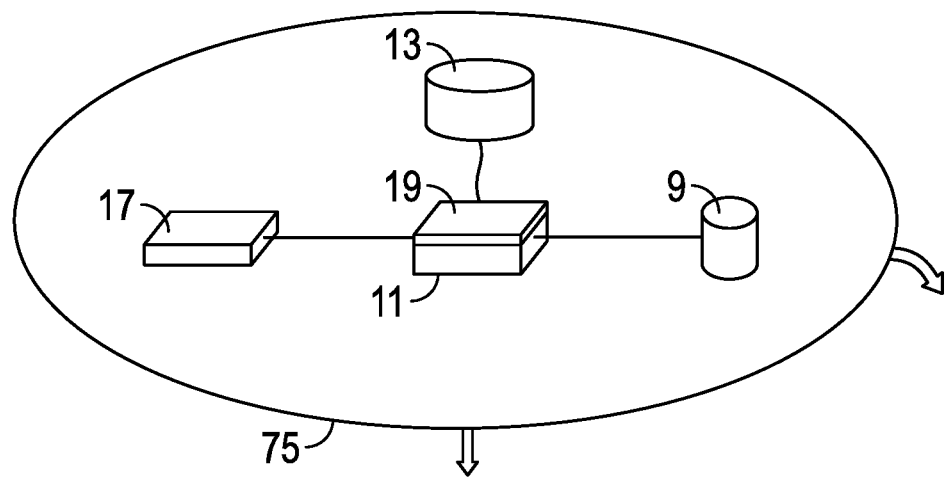
FIG. 1 schematically illustrates an electromagnetic logging system in accordance with embodiments of the present disclosure.
Figure 1:
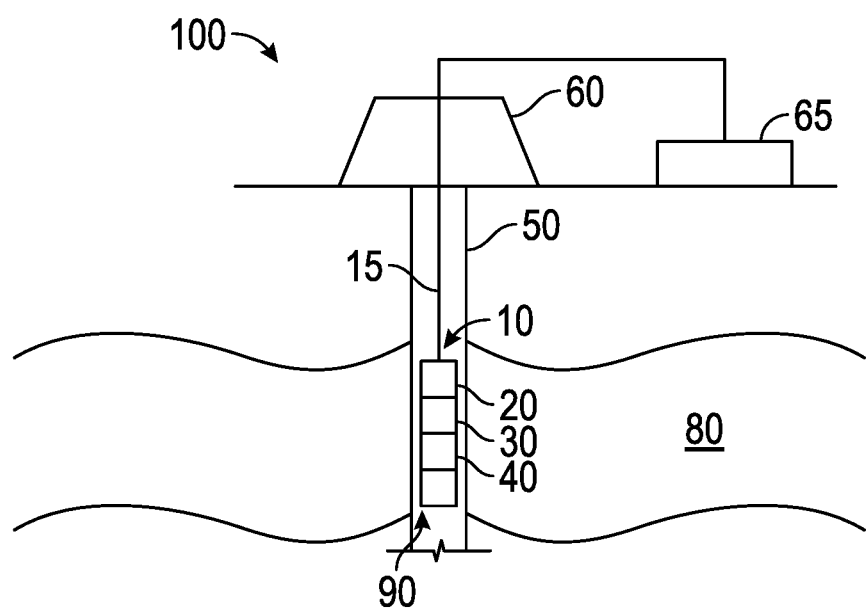

This disclosure generally relates to exploration for hydrocarbons involving electromagnetic investigations of a borehole penetrating an earth formation. These investigations may include estimating at least one parameter of interest of the earth formation.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of EM well tools and in all phases of well construction and production. Accordingly, the embodiments discussed below are merely illustrative of the applications of the present disclosure.

In aspects, this disclosure relates to galvanic resistivity imaging of an earth formation surrounding a borehole. In other aspects, this disclosure relates to estimating a parameter of interest, such as, for example, a resistivity of the earth formation. Illustrative methods for estimating resistivity may include the acquiring and utilization of information characterizing resistivity of the formation. This information may be acquired by tools deployed into the borehole. For context, an exemplary system for deploying and using such tools to acquire this information is described below.

It is a technical challenge to obtain sufficiently accurate information at a sufficient resolution while logging in a high temperature and high pressure borehole environment. When tool geometry creates a disjoint gap between the EM sensor and surrounding metal, as in the case of pad-deployed EM sensors conveyed by a carrier body, the EM field will produce a resonance effect along the disjoint which deteriorates the quality of tool measurements. The gap may be filled with borehole fluid having an electrical resistivity significantly larger than that of the metal carrier body.

Aspects of the present disclosure include a flexible conductive element that when installed at the disjoint will electrically close the gap by keeping the pad and carrier grounded while still allowing relative movement in/out of the carrier to conform to borehole rugosity. The presence of the flexible element allows the EM field to dissipate and thus reduce the resonance effect due to capacitive coupling between the pad and the carrier.

Aspects of the present disclosure include an electromagnetic (EM) well logging apparatus for investigating a formation from a fluid-filled borehole intersecting the formation. The apparatus may include a carrier body having a pocket formed in an outer surface, the pocket being defined by a plurality of walls and a bottom; and a pad configured to emit EM energy, the pad having an outer face, a plurality of sides complementary to the plurality of walls, and an inner face positioned adjacent to the bottom, wherein the pad is movably disposed in the pocket such that a gap separates at least one wall of the plurality of walls and at least one side of the plurality of sides. The apparatus may have at least one electrically conductive member forming an electrical connection between the carrier body and the pad and covering the gap. The carrier body and pad may be configured in accordance with a variety of embodiments, and may be configured for galvanic and/or inductive resistivity measurements, propagating wave measurements, dielectric measurements, and so on, as will occur to those of skill in the art.

Historically, galvanic imaging tools include at least one current transmitter which introduces current into the formation and at least one return electrode at which current returns through the mandrel to the tool. Resistance (or complex impedance) may be measured between the two electrodes. Ideally, current flows directly from the current transmitter through the earth formation and returns through the return electrode. In some downhole situations, however, the resistivity tool is separated from the formation by a gap filled with drilling fluid ('mud'). The gap may be uniform along the length of the borehole or may experience variations due to borehole rugosity.

In current dielectric logging tools, the magnitude and phase of an electromagnetic wave propagating in the formation is measured at multiple receivers. The relative magnitude and phase of a detected signal at the respective receivers is used to obtain εr and σ, which are functions of frequency due to the dispersive behavior of the formation. Electromagnetic waves are energized in the formation using a transmitter antenna disposed in the borehole. The attenuation and phase difference between signals received by spaced receiver antennas disposed in the borehole may be used to estimate the complex permittivity, which may be used to estimate a water saturation and other parameters of interest of the formation. In practice, the measurement is performed at multiple frequencies in order to obtain a good estimate of the dispersive behavior.

The parameters of the volume of interest of the formation affecting dielectric behavior of the formation include water saturation, water conductivity, permittivity of dry rock, permittivity of hydrocarbons, textural parameters of the formation (e.g., grain shape), and total porosity. As dielectric dispersive behavior of the volume is sensitive to these parameters, measuring the dielectric behavior of the formation at multiple frequencies provides a means to quantify these parameters.

Measuring the dielectric dispersive behavior of the formation and fitting it to mixing laws that are shown to be representative of the behavior of the formation under study provides information on the volume fraction of each component and formation texture information. This information is invaluable for estimating the hydrocarbon content in the reservoir under study.

Parameters of interest of the earth formation may be estimated using an EM well logging system. General embodiments in accordance with the invention may include the EM well logging system and methods for evaluating an earth formation intersected by a borehole using a carrier associated with a plurality of sensor arrays.

FIG. 1 schematically illustrates an electromagnetic logging system 100 having a downhole tool 10 configured to acquire information for producing a model (e.g., a resistivity image) of the earth formation 80 or a parameter of interest of a formation 80. The system 100 may include a conventional derrick 60 erected on a derrick floor 70. A conveyance device (carrier 15) which may be rigid or non-rigid, may be configured to convey the downhole tool 10 into wellbore 50 in proximity to formation 80. The carrier 15 may be a drill string, coiled tubing, a slickline, an e-line, a wireline, etc. Downhole tool 10 may be coupled or combined with additional tools e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit. Drilling fluid ('mud') 90 may be present between the formation 80 and the downhole tool 10, such that drilling fluid 90 affects the value of resistivity measurements obtained from the formation.

A surface control unit or controller 65 receives signals from downhole sensors 40 and other sensors used in the system 100 and processes such signals according to programmed instructions provided to the surface control unit 65. The surface control unit 65 may display desired parameters and other information on a display/monitor that is utilized by an operator. The surface control unit 65 may be a computer-based unit that may include an information processing device 75. The surface control unit 65 may further communicate with a downhole control unit 20 at a suitable location on downhole tool 10. The surface control unit 65 may process data relating to the operations and data from the sensors 40, and may control one or more downhole operations performed by system 100.

In one embodiment, electronics 30 associated with sensors 40 may be configured to record and/or process the information obtained. To perform the treatments during a single trip, the tool may use a "high bandwidth" transmission to transmit the information acquired by sensors 40 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "near real-time."

Surface control unit or downhole control unit may be configured to control sensors described above and to estimate a parameter of interest according to methods described herein. Control of these components may be carried out using one or more models using methods described below.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 2A:
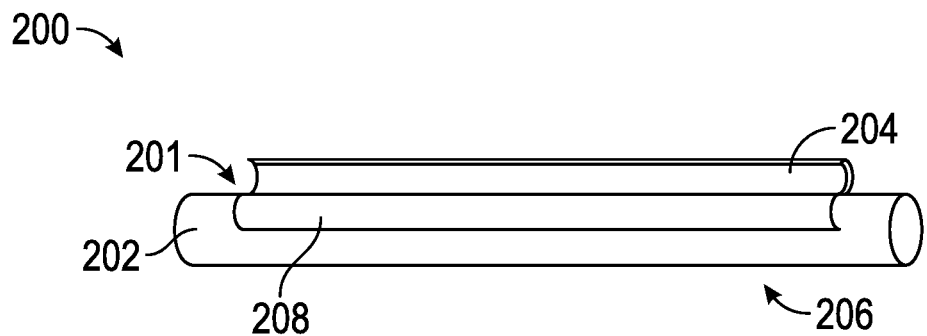
FIGS. 2A-2F show an electromagnetic (EM) well logging tool in accordance with embodiments of the present disclosure.

FIGS. 2A-2F show an electromagnetic (EM) well logging tool in accordance with embodiments of the present disclosure. Referring to FIG. 2A electromagnetic (EM) well logging tool 200 (referred to herein as well logging tool, downhole tool, logging tool, or tool) is configured to investigate a formation from a fluid-filled borehole intersecting the formation, and may be implemented as a multi-frequency dielectric array logging tool, electromagnetic tool, dielectric tool, or resistivity imaging tool.

Electromagnetic (EM) well logging tool 200 includes a carrier body 206 (e.g., a mandrel, a bottom hole assembly (BHA), housing, enclosure, drill string, wireline tool body, etc.) having a pocket 201 formed in an outer surface 202. The tool 200 further includes a pad 204 configured to emit EM energy and at least one electrically conductive member 208 forming an electrical connection between the carrier body 206 and the pad 204. The pad 204 is movably disposed in the pocket 201 and includes sensors 240 responsive to parameters of interest of the earth formation, as described in further detail herein. In some implementations, the carrier body is configured to protectively store the pad 204 when not in operation. Additionally or alternatively, the pocket 201 allows radial travel of the pad 204 toward or away from a longitudinal axis of the tool body, as discussed with respect to FIG. 2D below. The pad 204 may be slideably disposed in the pocket.

With the pad extended, the pads may engage the borehole wall and make measurements indicative of at least one parameter of interest of the earth formation, such as (i) a water saturation of the formation, (ii) a water conductivity of the formation, (iii) a relative complex permittivity of the formation, (iv) a permittivity of rock matrix, (v) a complex permittivity of mudcake, (vi) a thickness of the mudcake, (vii) a texture of the rock, (viii) cementation exponent, (ix) saturation exponent, (x) cation exchange capacity, and (xi) a relative phase shift, (xii) a relative amplitude.

Sensors 240 may be implemented as measure electrodes or inductive antennae (or a combination of these) azimuthally or vertically distributed across the face 225 of the pad in a sensor array. The plurality of measure electrodes may include a combination of vertically and azimuthally displaced measure electrodes. In another aspect, a plurality of vertically displaced measure electrodes may correspond to vertically displaced current electrodes. Other electrode configurations using circular button electrodes may also be used.

Sensors 240 may include transmitter T1, T2 and receivers R1, R2, as described in further detail with respect to FIGS. 3A-3D below. The transmitters may be configured to radiate EM waves into the formation; and the receivers may be configured to be responsive to the EM waves radiating in the formation and generate a signal that is indicative of the parameter of interest (e.g., phase shift, amplitude, water saturation, water conductivity, or permittivity of the formation, salinity). A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors.

Figure 2B:
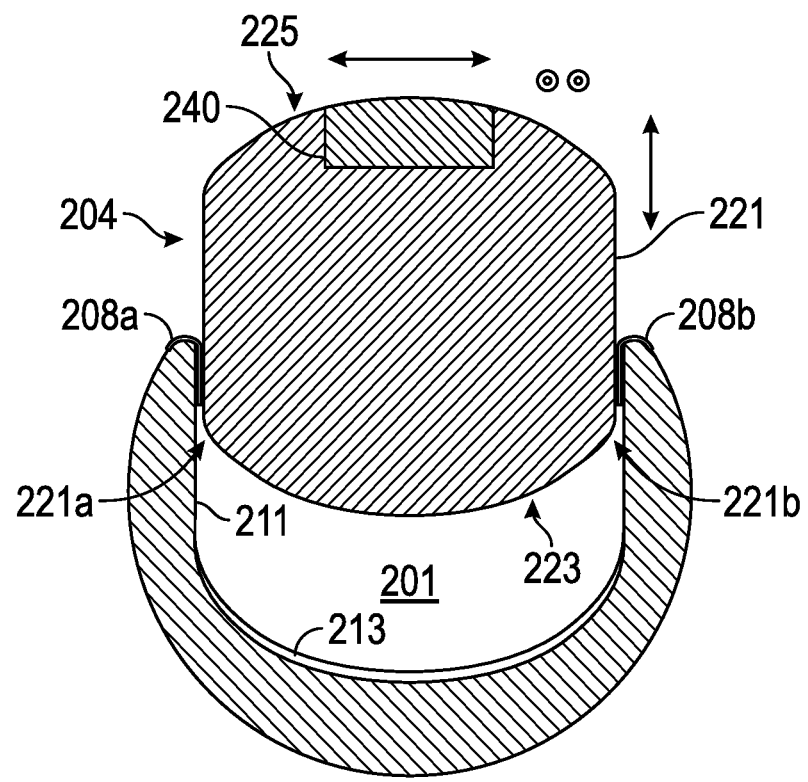
Figure 2C:
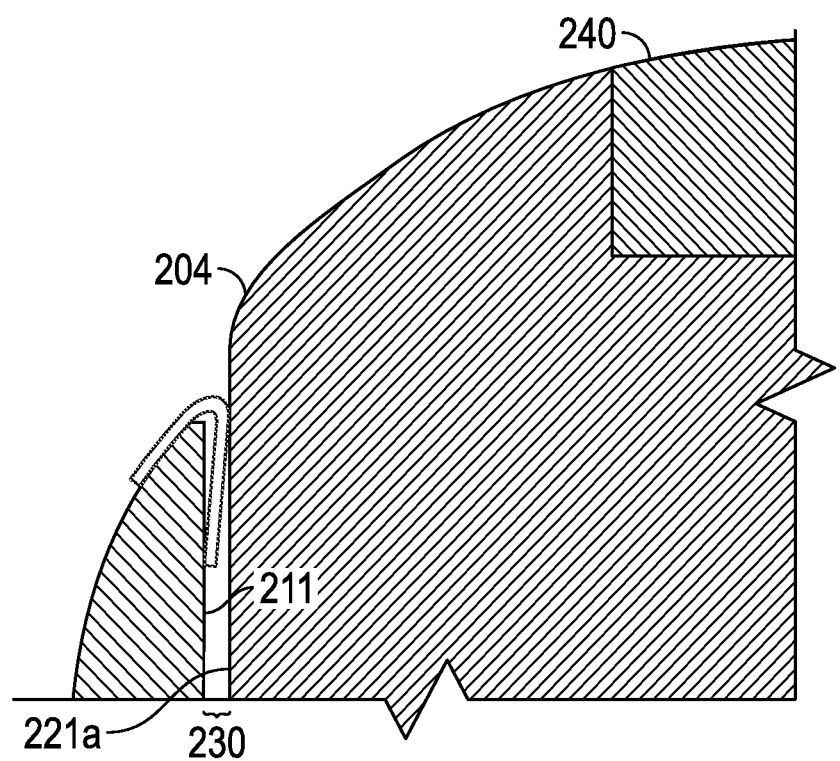

FIGS. 2B & 2C show a cross section of the tool 200 illustrating cooperation of the pad 204, the pocket 201, and electrically conductive member 208. The pocket 201 is defined by a plurality of walls 211 and a bottom 213. The pad 204 has an outer face 225, a plurality of sides 221 complementary to the plurality of walls 211, and an inner face 223 positioned adjacent to the bottom 213. The pad 204 is movably disposed in the pocket 201 such that a gap 230 separates at least one wall 211 of the plurality of walls and at least one side 221 of the plurality of sides. Dimensions of the gap may vary during operation of the apparatus.

As implemented in FIGS. 2B & 2C, a pair of electrically conductive members 208a and 208b cover the gaps 221a and 221b, respectively. First electrically conductive member 208a and second electrically conductive member 208b may be flexible electromagnetic shields comprising strips of conductive material, such as, for example, metal, conductive carbon fiber, carbon nanotubes, or other conductive materials. The electromagnetic shields may be attached via welding, bolted on, or through the use of any other type of fastener. The electrically conductive member may be a resilient member configured to apply a spring force to the pad, and may be configured to frictionally engage at least one of the carrier body and the pad. The conductive member may be a strip parallel with the long axis of the carrier body. The electrically conductive member may cover a majority of the gap. Alternatively, at least a portion of the at least one electrically conductive member may substantially mitigate the capacitive coupling without covering a majority of the gap by bridging the gap at locations where capacitive coupling between the body and the pad substantially effects the measurement signals. That is, shielding may be placed in locations where parasitic capacitive coupling effect would otherwise produce severe effects.

In FIGS. 2B & 2C, the at least one electrically conductive member is disposed in the gap, and may form the electrical connection between the pad and the carrier body along a majority of a length of the gap. Each of the electrically conductive members 208a and 208b form an electrical connection between at least one wall 211 of the plurality of walls of the carrier body 206 and at least one side 221 of the plurality of sides of the pad 204. The electrical connection may be formed by sliding galvanic contact between the at least one electrically conductive member 208 and either or both of the at least one wall 211 and the at least one side 221. A first end of each conductive member 208 is physically fixed to the carrier body 206 and the opposing end is left free between the pad and carrier body. Thus, by this design, each conductive member 208 is configured such that it may be deflected to establish an electric ground while avoiding inhibition of movement of the EM pad and associated sensors in and out of the pocket 201.

Figure 2D:
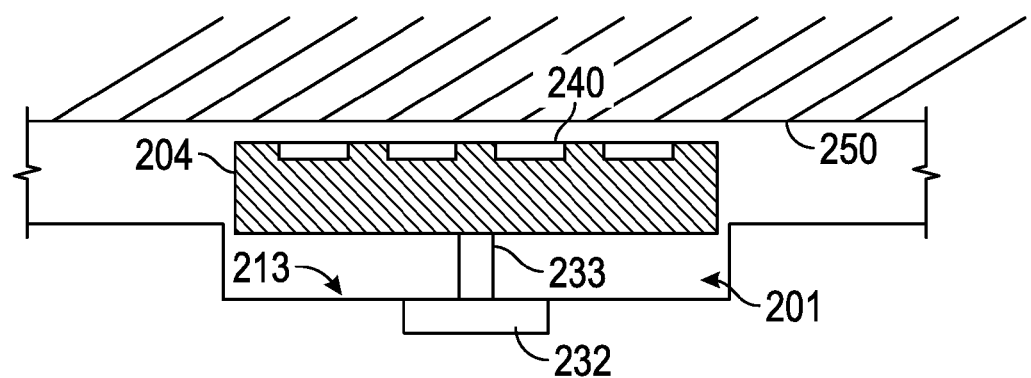

FIG. 2D illustrates a schematic longitudinal cross section of the tool. As shown, the pocket 201 is elongated along a long axis of the carrier body. Under the direction of processors or other control circuitry described herein, an actuator 232 operates to move an arm 233 which moves the pad 204 to engage the borehole wall such that the sensor 240 is predictably responsive to parameters of the formation. The actuator may be electrical, hydraulic, or mechanical in nature, or combinations of these (electromechanical). The pad may have translational motion in six degrees of freedom, depending on design of the actuator and arm. The at least one electrically conductive member may be configured to maintain the electrical connection while permitting this translational motion. Due to eccentering of the tool and borehole rugosity, movement of the pad toward or away from the borehole may be necessary to place the pad in an optimal distance from the wall for measurement. The pad may be said to be engaged with the borehole wall when at the optimal distance.

The term "engage," as used herein, may further include contact with the borehole, urged against the borehole wall, pressed firmly against the borehole wall, or simply positioned proximate the borehole wall. The term "proximate," as used herein, may be defined as the pad being near the borehole such that measurements may be taken from the pad that are useful in evaluating the borehole, earth formation, or both.

Figure 2E:
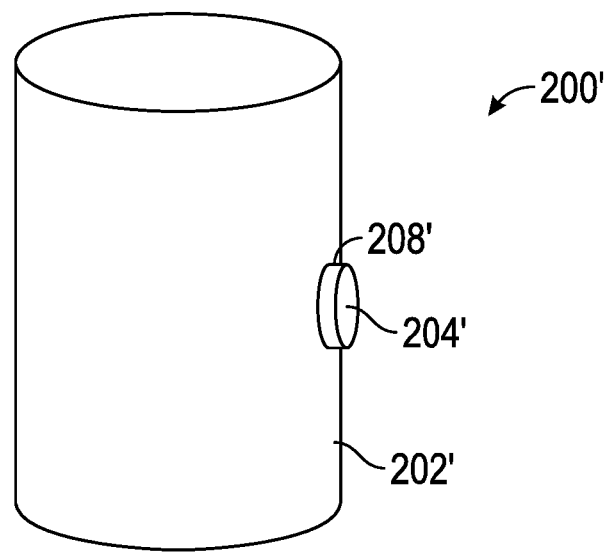

FIG. 2E shows another tool in accordance with embodiments of the disclosure. Tool 200' is substantially circular and, when actuated, extends from a circular pocket in the tool body 206' to conduct measurements. The electrically conductive member 208' may be substantially cylindrical or frustoconical.

Figure 2F:
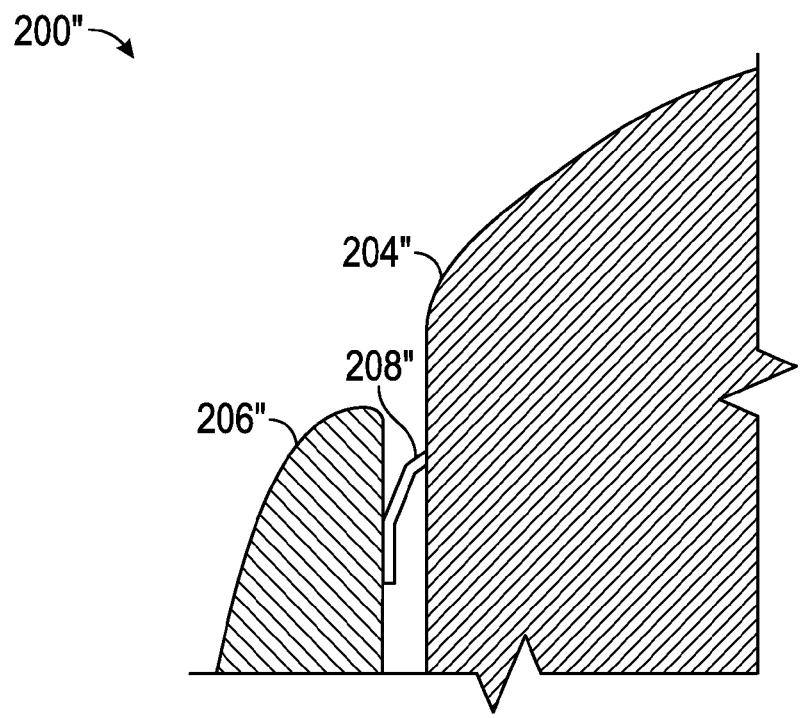

FIG. 2F shows another tool in accordance with embodiments of the disclosure. Tool 200" functions similarly to tool 200, but electrically conductive member 208" is a resilient member attached to the pad 204" and frictionally engaging the carrier body 206" at the interior wall of the pocket.

The EM well logging tools described herein may include circuitry configured to generate measurement signals responsive to emitted EM energy from the pad, along with an orientation module including a magnetometer and an accelerometer (or inertial guidance system), at least portions of which may be mounted above the pad (and pocket) on the tool. The upper portion of the tool may also contain a telemetry module for sampling, digitizing and transmission of the measurements, or of downhole parameters estimated from the measurements, from the various components uphole to surface control unit 65 in a conventional manner.

The gap may have sufficient dimensions to produce resonant parasitic electromagnetic signals in the measurement signals from capacitive coupling between the carrier body and the pad. The capacitive resonance may be localized within the gaps, and thus separate from the formation. Historically, this configuration would produce significant error in the measurement signals. In the present disclosure, however, the at least one electrically conductive member mitigates the capacitive coupling. Under the techniques described herein, capacitive coupling may be sufficiently mitigated such that the measurement signals are substantially free of resonant parasitic electromagnetic signals.

Various types of electrical sensors may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may be particularly useful in addressing challenges associated with (EM) wave propagation, particular embodiments may employ the techniques disclosed herein in connection with various types of induction logging, including multi-component induction logging. In some embodiments, the electromagnetic tool may include at least one transmitting antenna and at least one receiving loop antenna mounted on a pad.

The tool may be operated in at least two modes. A first mode may be referred to as Mini-MPR (Multiple Propagation Resistivity) mode that may measure attenuation and a phase difference between the two receivers. The electromagnetic tool 10 may also be operated in a second mode (an induction mode) in which a compensated magnetic field (voltage) may be measured. The current in the transmitter coil may induce a magnetic field in the earth formation 80. This magnetic field, in turn, may cause eddy currents to flow in the earth formation 80. Because of the presence of these formation currents, a magnetic field may be coupled into a receiver coil R thereby generating a receiver signal. Logging tools having "a receiver coil" and "a transmitter coil" each comprised of several coils arranged in a predetermined fashion to obtain a desired response may be used. The receiver signal may then be amplified and applied to one or more phase sensitive detectors (PSDs). Each PSD may detect a phase component signal having a phase identical to a phase reference signal which may also be applied to the detector. The phase reference signal may have a predetermined phase relationship to the current in the transmitter coil(s). The output of the PSD(s) may be further processed downhole, or may be sent uphole to surface equipment for processing or display to an operating engineer.

In Mini-MPR mode, which may employ two symmetric transmitter antennas, attenuation and phase may be measured at each of the transmitter. The measurements may be averaged to give the final readings:

$$Att = \frac{Att_{T1} + Att_{T2}}{2}; \quad (4)$$

$$Pha = \frac{Pha_{T1} + Pha_{T2}}{2}$$

where the subscripts T1 and T2 denote the first and second receivers. Assuming a uniform earth formation for which the magnetic fields at the receiver locations are H1 and H2 and assuming that the two receivers have gains $G_1$ and $G_2$, the ratio of the two receiver outputs for the 1 st transmitter may be derived from the ratio:

$$R_{T1} = \frac{G_2 H_2}{G_1 H_1} = \frac{G_2}{G_1} \frac{A_2}{A_1} e^{i\Delta\phi} \quad (5)$$

where $A_1$ and $A_2$ are the amplitudes of $H_1$ and $H_2$, respectively; $\Delta\phi$ is the phase difference between the two receivers. From eqn. (5) it follows $$Att_{T1} = -20\log\frac{G_2}{G_1} - 20\log\frac{A_2}{A_1}, \quad (6)$$

$$Pha_{T1} = \Delta\phi. \quad (7)$$

Thus, it is clear that the gain change affects attenuation measurement but not the phase difference measurement. Similarly, attenuation measurement for the 2nd transmitter is derived from $$R_{T1} = \frac{G_1 H_2}{G_2 H_1} = \frac{G_1}{G_2} \frac{A_2}{A_1} e^{i\Delta\phi}. \quad (8)$$

The attenuation measurement may be written as:

$$Att_{T1} = -20\log\frac{G_1}{G_2} - 20\log\frac{A_2}{A_1}. \quad (9)$$

Averaging equations (5) and (6) may remove the effect of gain variation. Those versed in the art would recognize that measurements of amplitude and phase can, in addition to resistivity determination, also be used for determining the dielectric constant of the earth formation.

In the induction mode, one receiver loop coil may serve as a main receiver and the other as a bucking receiver. The transmitting antennas may include loops and/or electric dipoles. For loop transmitter antennas, the transmitters and receivers may be in one of three orientations. If the z-axis of the tool is parallel to the longitudinal axis of the tool, then the x-axis may be radial through the center of the pad, and the y-axis may be tangential to the pad. The zz-component may refer to a z-source and a z-receiver and so on. In some embodiments, xx-transmitters and receivers may be used.

As described above, EM logging may also include estimating effective dielectric permittivity. Dielectric permittivity arises in sedimentary rock from the ability of electric dipoles to align themselves with an alternating electromagnetic field, such as one induced by a downhole tool. Several phenomena contribute to εr in a porous earth formation. The phenomena of changing dielectric and conductivity values with frequency is known as dispersion. The relaxation frequency, relative dielectric constant εr, and conductivity σ will depend upon various factors such as porosity, mean pore size, water saturation, formation texture, the resistivity of the water Rw, and shale mineralogy.

Geophysical media within an earth formation may be mixtures of materials, with each material exhibiting different dielectric characteristics. In remote-sensing applications, it may be desirable to approximate the microscopically complicated mixture as macroscopically homogeneous volume and characterize it by an effective permittivity. One constituent in these mixtures is typically water. The dielectric properties of the volume are sensitive to small variations in the fractional component volumes, because the permittivity of water is usually very different than that of the other components (e.g., hydrocarbons and dry rock).

Dielectric logging uses the contrast between dielectric constant of water, rock and oil to estimate the formation water content. The permittivity of the formation can be considered as a complex quantity which contains dielectric constant and conductivity in its real and imaginary component $$\bar{\varepsilon}_r(\omega) = \varepsilon_r(\omega) + i\frac{\sigma(\omega)}{\omega\varepsilon_0} \quad (1)$$

where $\tilde{\varepsilon}_r$ is the complex value representing relative permittivity, $\varepsilon_r$ is relative dielectric constant, $\sigma$ is electrical conductivity, $\omega$ is angular frequency and $\varepsilon_0$ is dielectric constant of vacuum.

Figure 3A:
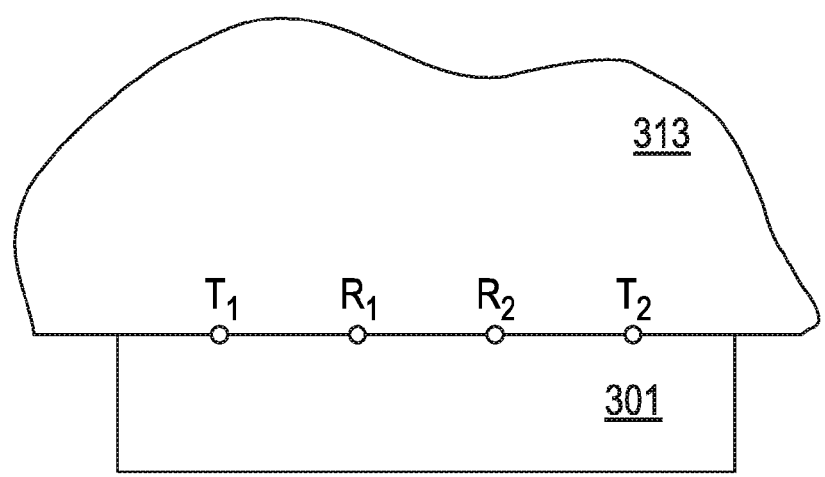
FIGS. 3A-3D show the phase shifts of wave propagation tool according to embodiments of the present disclosure.

FIG. 3A depicts a cross-sectional view of downhole tool 201 (e.g., electromagnetic tool, dielectric tool, or other logging tool, etc.) in a homogenous medium. The tool 301 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1.

A conventional technique of measurement compensation involving two receivers positioned symmetrically with respect to two transmitters (as shown in FIG. 3A) is demonstrated. The relative phase shift between R1 and R2 when T1 is fired may be given by:

$$\theta_{R_1R_2}^{T1} = \theta_{R_2}^{T1} - \theta_{R_1}^{T1} \tag{10}$$

The relative phase shift between R1 and R2 when T2 is fired may be given by:

$$\theta_{R_1R_2}^{T2} = \theta_{R_1}^{T2} - \theta_{R_2}^{T2} \tag{11}$$

The compensated relative phase may be given by:

$$\theta_{R_1R_2} = 0.5(\theta_{R_1R_2}^{T1} + \theta_{R_1R_2}^{T2}) \tag{12}$$

where $\theta_{R_j}^{Ti}$ is the phase measured by receiver j when transmitter i is fired and can be written as $$\theta_{R_j}^{Ti} = \theta_{T_i} + \theta_{R_j} + \theta(r) \tag{13}$$

in which $\theta_{T_i}$ and $\theta_{R_j}$ are the phase shifts of transmitter i and receiver j with respect to a common source and $\theta(r)$ is the phase shift due to wave traveling in the probed medium between transmitter and receiver which are apart by a distance of r.

Equations (10) and (11) eliminate the effect of internal phase shift at T1 and T2. As it can be seen from plugging in Equation 13 in Equations 10 and 11 and using Equation 12 one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 3B:
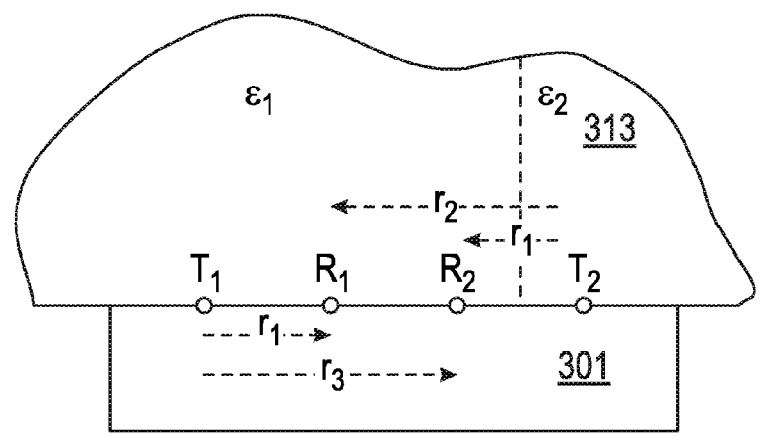

FIG. 3B depicts a cross-sectional view of tool 301 in heterogenous media having relative permittivities, $\varepsilon_1$ and $\varepsilon_2$. Generally, for an electromagnetic wave propagating in a near field regime, the phase difference between the wave passing through points in space is not only a function of the distance between the two points ($r_2-r_1$) but also a function of absolute position of those points ($r_1$ and $r_2$). Consider the medium of FIG. 3B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\in_2 > \varepsilon_1$).

Figure 3C:
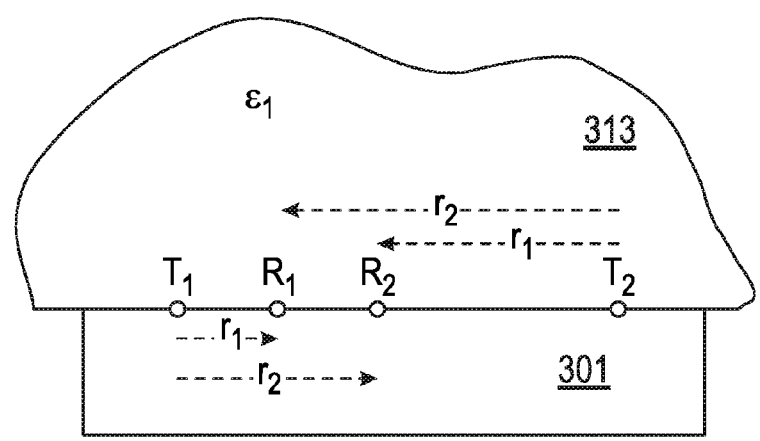

FIG. 3C shows the approximate effect of heterogeneous media on the propagation of an electromagnetic wave. Referring to FIGS. 3B-3C, although $r_2-r_1=r_2^*-r_1^*$, $r_2 \neq r_2^*$ and $r_1 \neq r_1^*$; thus, the "simulated" distances between transmitter and receivers from the left and right are not equal. This leads to an unequal phase shift for an electromagnetic wave travelling from these transmitters, which renders the traditional approach invalid.

Figure 3D:
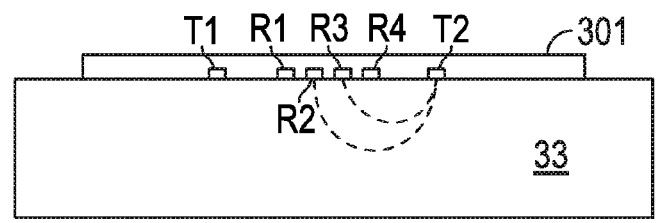

FIG. 3D shows the phase shifts of wave propagation tool 307 according to embodiments of the present disclosure. Tool 307 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 3D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T1} = \theta_{T_1R_3} - \theta_{R_3}^{sh} \tag{14}$$

$$\theta_{R_2}^{T1} = \theta_{T_1R_2} - \theta_{R_2}^{sh} \tag{15}$$

where $\theta_{R_j}^{Ti}$ is the phase shift recorded at receiver j when transmitter i is fired, $\theta_{T_iR_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T1} - \theta_{R_3}^{T1}$) may be expressed as:

$$\theta_{R_2R_3}^{T1} = \theta_{T_1R_2} + \theta_{R_2}^{sh} - \theta_{T_1R_3} - \theta_{R_3}^{sh} \tag{16}$$

Upon firing transmitter T2, the phase shifts at R2 and R3 may be expressed as:

$$\theta_{R_3}^{T2} = \theta_{T_2R_3} - \theta_{R_3}^{sh} \tag{17}$$

$$\theta_{R_2}^{T2} = \theta_{T_2R_2} - \theta_{R_2}^{sh} \tag{18}$$

The relative phase shift between receivers R3 and R2 after firing transmitter T2 may be expressed as $(\theta_{R_3}^{T2} - \theta_{R_2}^{T2})$:

$$\theta_{R_3R_2}^{T2} = \theta_{T_2R_3} + \theta_{R_3}^{sh} - \theta_{T_2R_2} - \theta_{R_2}^{sh} \tag{19}$$

Conventionally, it may be assumed that these phase shifts are equal:

$$\theta_{T_2R_2} = \theta_{T_1R_3}, \theta_{T_2R_3} = \theta_{T_1R_2} \tag{20}$$

After substituting $\theta_{T_1R_2}$ and $\theta_{T_1R_3}$ into Eq. (19), the relative phase shift between receivers R3 and R2 after firing transmitter T2 (i.e., $\theta_{R_3}^{T2} - \theta_{R_2}^{T2}$) may be given by:

$$\theta_{R_3R_2}^{T2} = \theta_{T_1R_2} + \theta_{R_3}^{sh} - \theta_{T_1R_3} - \theta_{R_2}^{sh} \tag{21}$$

Thus, a compensated measurement for the relative phase between receivers R3 and R2 may be given as:

$$\theta_{R_2R_3}^{com} = \frac{(\theta_{R_2R_3}^{T1} + \theta_{R_3R_2}^{T2})}{2} \tag{22}$$

$$\theta_{R_2R_3}^{com} = \theta_{T_1R_2} - \theta_{T_1R_3} \tag{23}$$

Figure 4A:
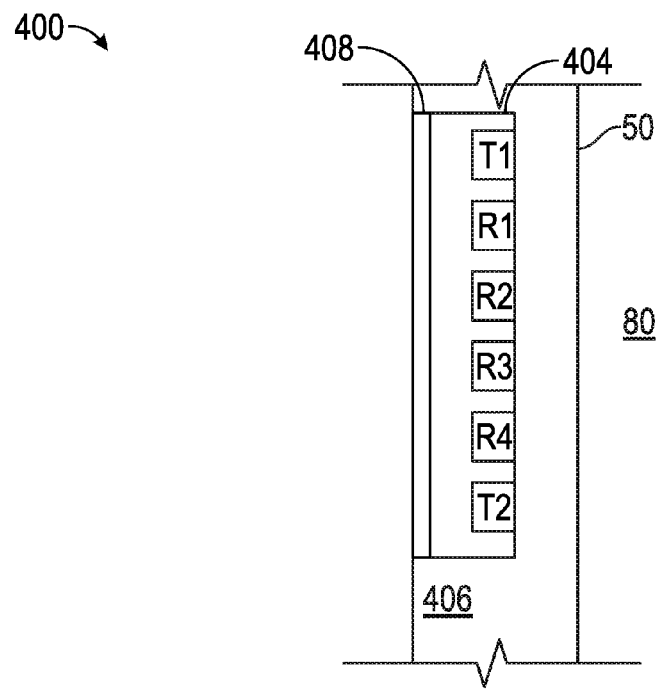
FIGS. 4A & 4B illustrate sensor configurations in accordance with embodiments of the present disclosure.
Figure 4B:
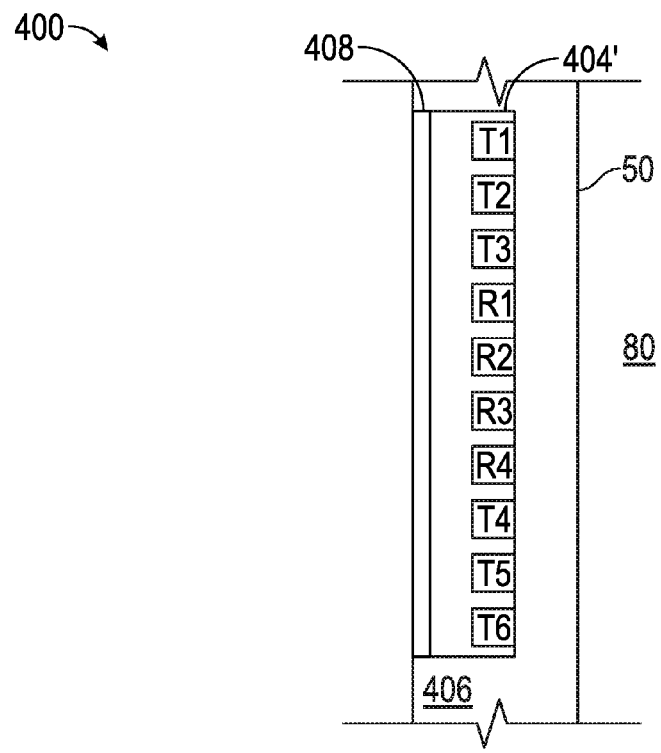

FIGS. 4A & 4B illustrate sensor configurations in accordance with embodiments of the present disclosure. FIG. 4A shows a schematic cross-sectional view of multi-frequency dielectric logging tool 400 in accordance with embodiments of the present disclosure. Dielectric tool 400 may include tool body 406 and a pad 404 having transmitters T1, T2 and receivers R1-R4 disposed on the pad. Electrically conductive member 408 covers the gap between tool body 406 and pad 404.

FIG. 4B shows a cross-sectional view of another multi-frequency dielectric logging tool in accordance with embodiments of the present disclosure. Dielectric tool 400' may include tool body 406 and a pad 404' having transmitters T1-T6 and receivers R1-R4. Electrically conductive member 408 covers the gap between tool body 406 and pad 404'.

Referring to FIGS. 4A & 4B, the transmitters may be positioned symmetrically with respect to the receivers. For example, on dielectric tool 400, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than π radians or 180° due to the formation and not taking into account internal phase shifts of the tool circuitry). Also, the spacing between R1 and R2 may not exceed one half wavelength of the EM wave propagating in formation 80. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies. Each transmitter or receiver may be configured to have a limited frequency range and tuned to discrete frequencies separated by at least 50 MHz.

In one example, the tool may be a dielectric probe. Data from a dielectric probe is used in this example where the attenuation and phase shift of electromagnetic wave propagating in a formation with unknown properties is used to obtain information on various components present within it (e.g., solid matrix, water, and oil). Due to large contrast between permittivity and conductivity of water and the other components present in formation, this probe may be used for identifying the volume fraction of water ($S_W$) and its salinity ($R_W$).

The probe may use only a few frequencies. As an example, each transmitter or receiver may be configured to operate at a frequency range within a band from 1 MHz to 2 GHz.

Three dimensional finite element analysis (FEA) with respect to downhole tools incorporating pad and mandrel assemblies reveals parasitic EM resonances due to small gaps between the pad and the mandrel housing wall. As used herein, the term "small gap" refers to a gap between 1 and 10 millimeters in width.

FIGS. 5A-5D illustrate the effects of electromagnetic shielding in these gaps on the measurements taken with the tools. Simulation results are shown for various tool measurements in 100 kohmm mud for a 1 ohmm formation.

Figure 5A:
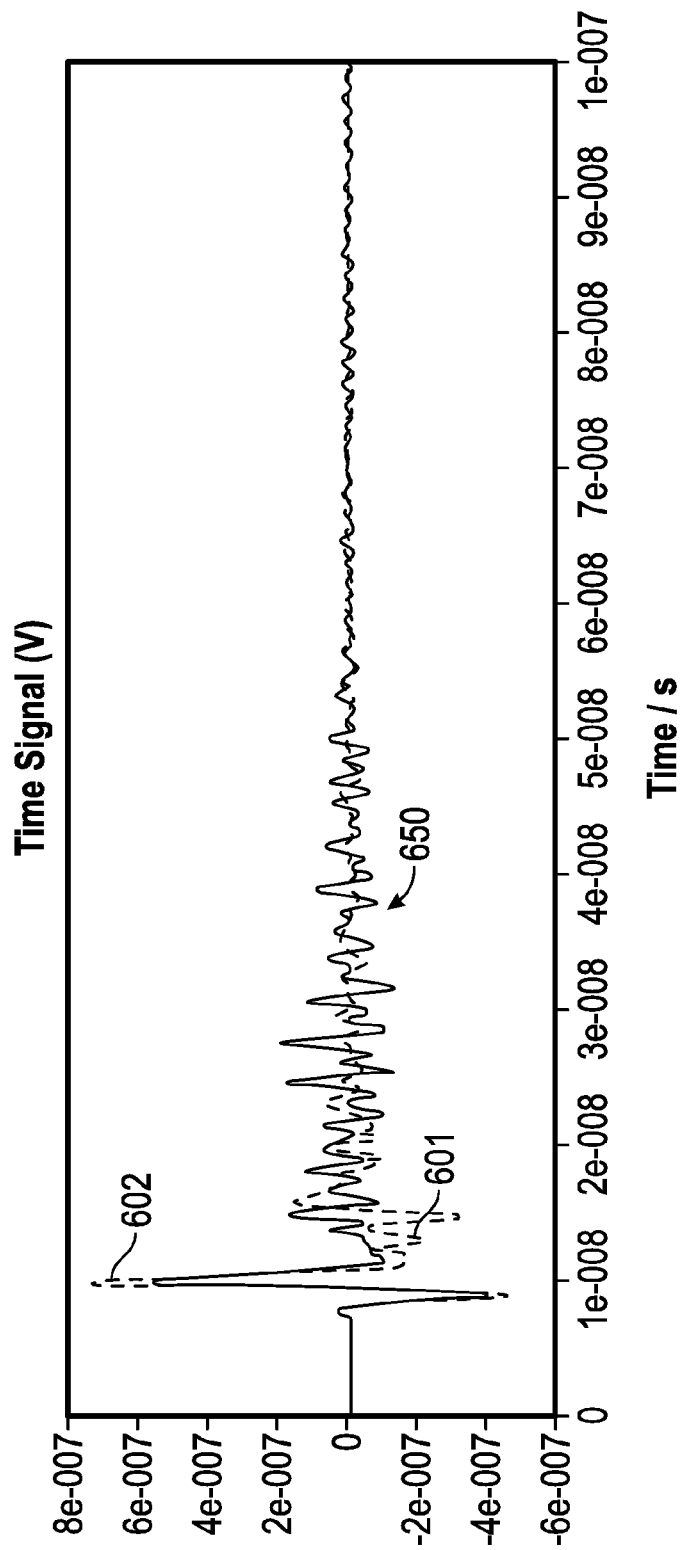
FIGS. 5A-5D illustrate the effects of electromagnetic shielding in these gaps on the measurements taken with the tools.

FIG. 5A shows curves of voltage over time for transmitter-receiver pairs representing a time signal in a receiver responsive to excitation from a transmitter. Curve 601 illustrates the signal for the T1-R4 pairing. Curve 602 illustrates the signal for the T6-R1 pairing. It is apparent that both signals display prolonged resonant time signals 650 due to capacitive effects. The results of the capacitive coupling in the T1R4 signal are different from those in the T6R1 signal due to pad asymmetry.

Figure 5B:
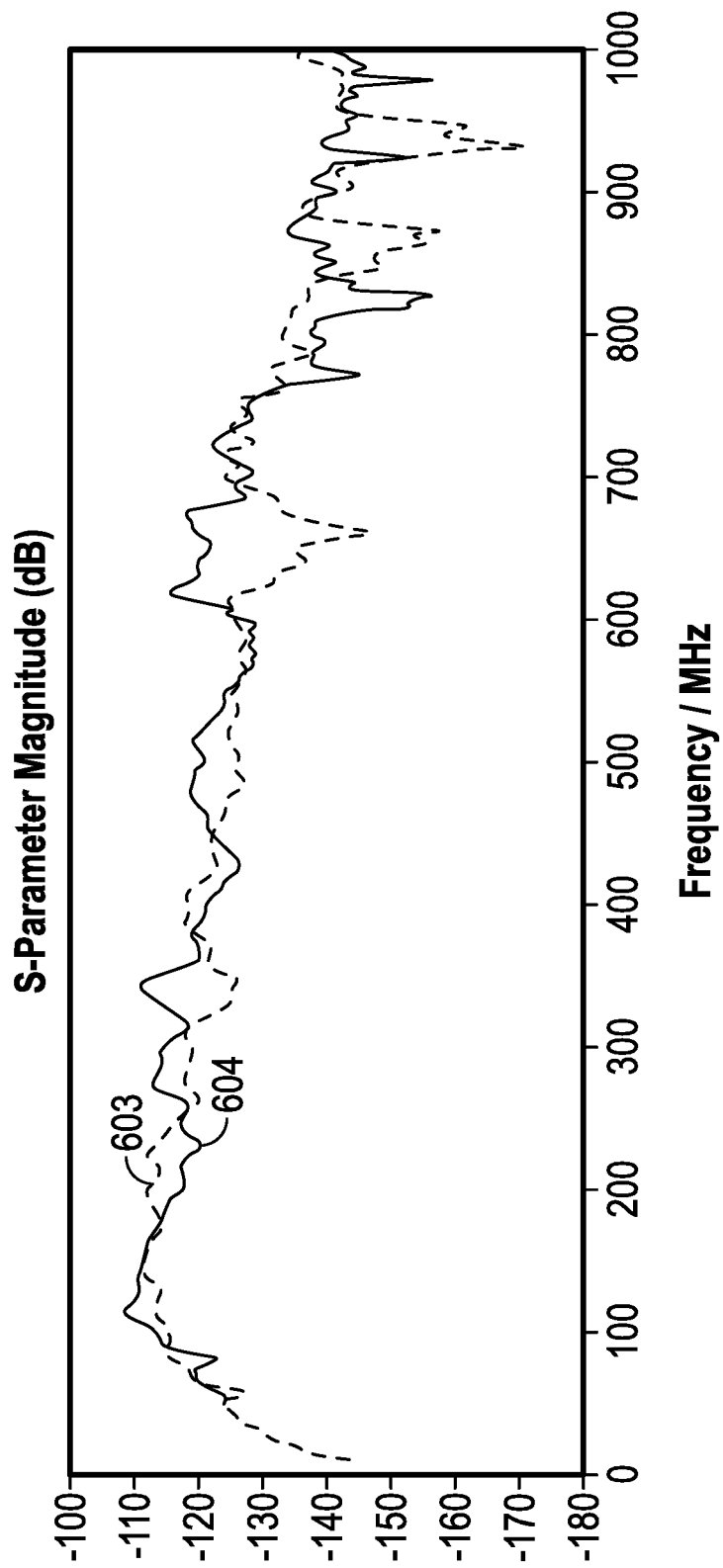

FIG. 5B shows curves of amplitudes of scattering parameters (|S21|) with respect to frequency for transmitter-receiver pairs. Curve 603 illustrates the signal for the T1-R4 pairing. Curve 604 illustrates the signal for the T6-R1 pairing. The values are noticeably different for most frequencies.

Figure 5C:
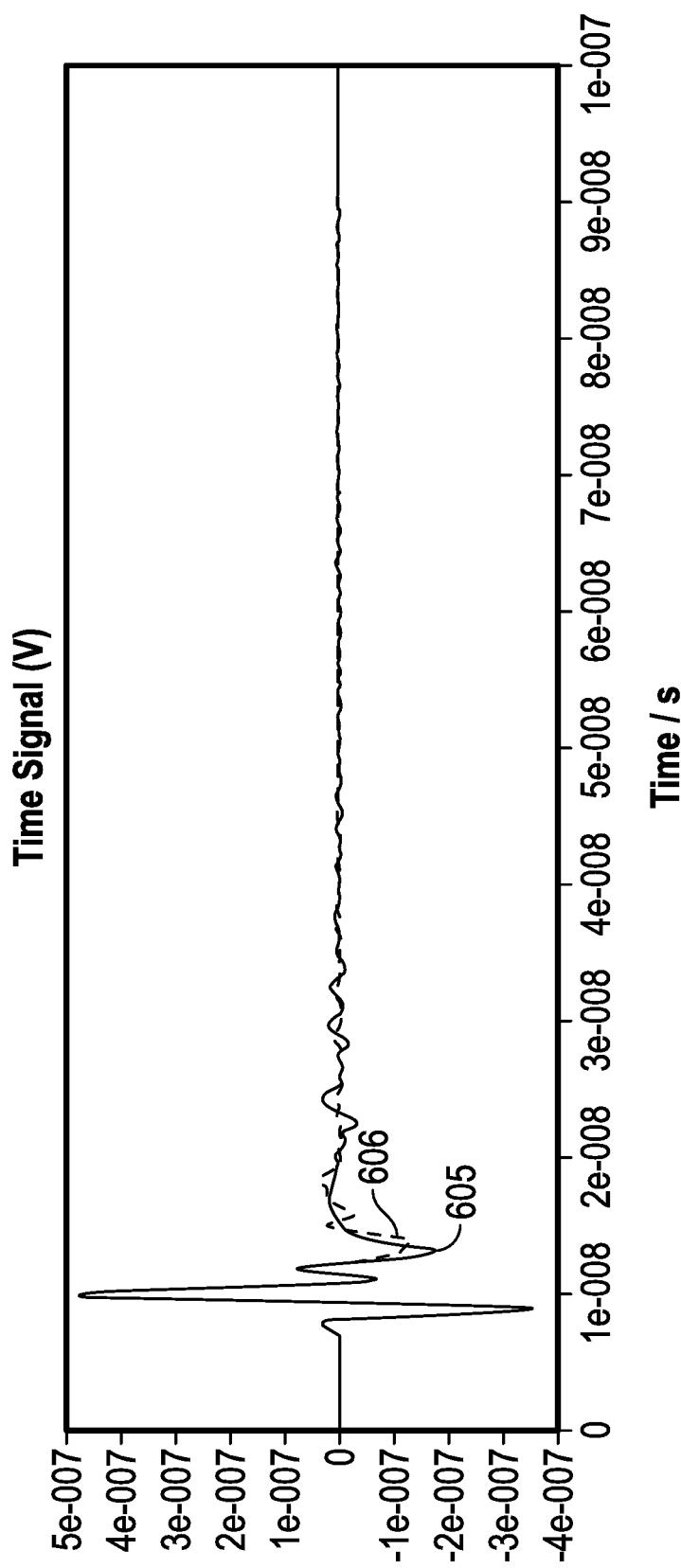

FIG. 5C shows curves of voltage over time for transmitter-receiver pairs representing a time signal in a receiver responsive to excitation from a transmitter for a model with the gap between the pad and the mandrel covered by a conductive element of the present disclosure, as described in further detail above. Curve 605 illustrates the signal for the T1-R4 pairing. Curve 606 illustrates the signal for the T6-R1 pairing. The signals are substantially free of resonant time signals.

Figure 5D:
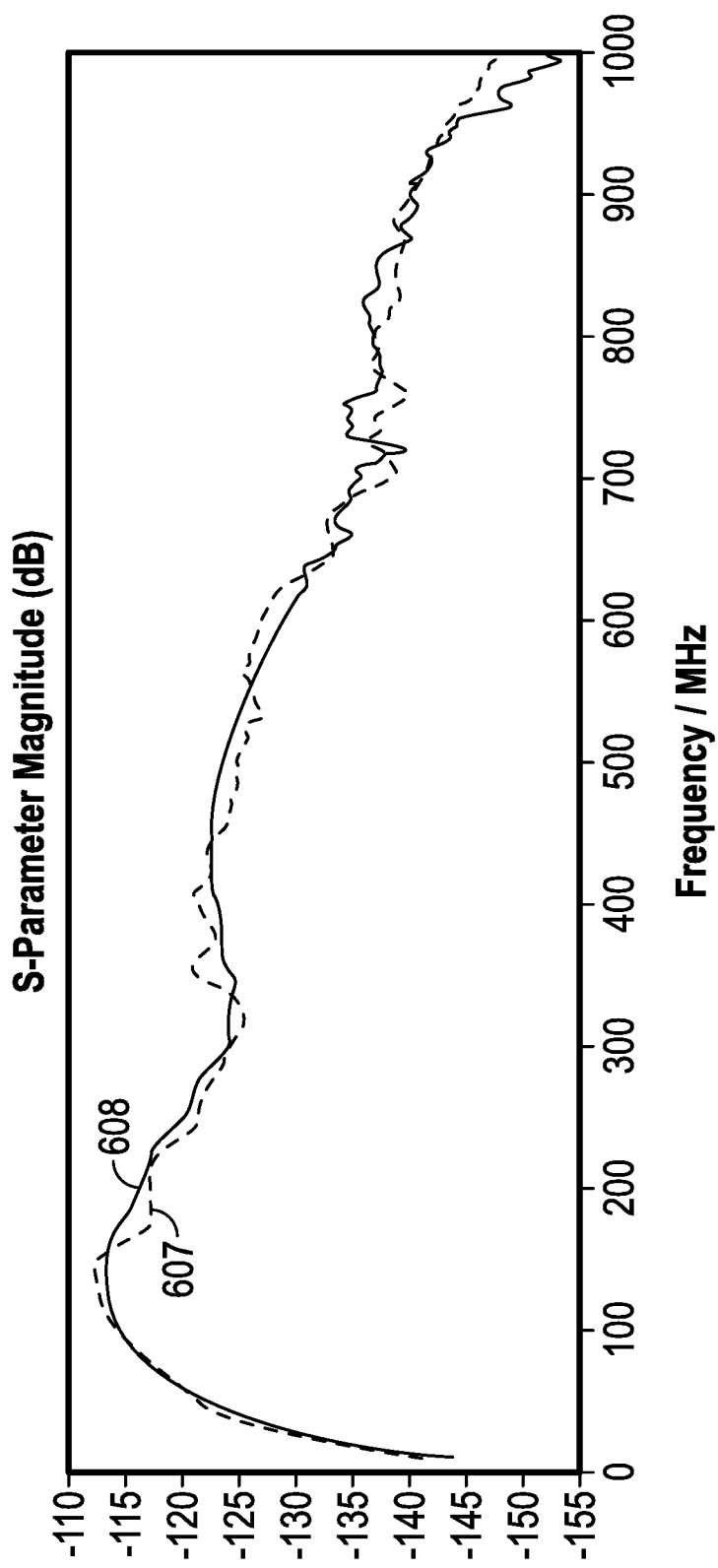

FIG. 5D shows curves of amplitudes of scattering parameters (|S21|) with respect to frequency for transmitter-receiver pairs. Curve 607 illustrates the signal for the T1-R4 pairing. Curve 608 illustrates the signal for the T6-R1 pairing. Symmetry between the symmetric transmitter-receiver pairs is noticeably improved.

Figure 6A:
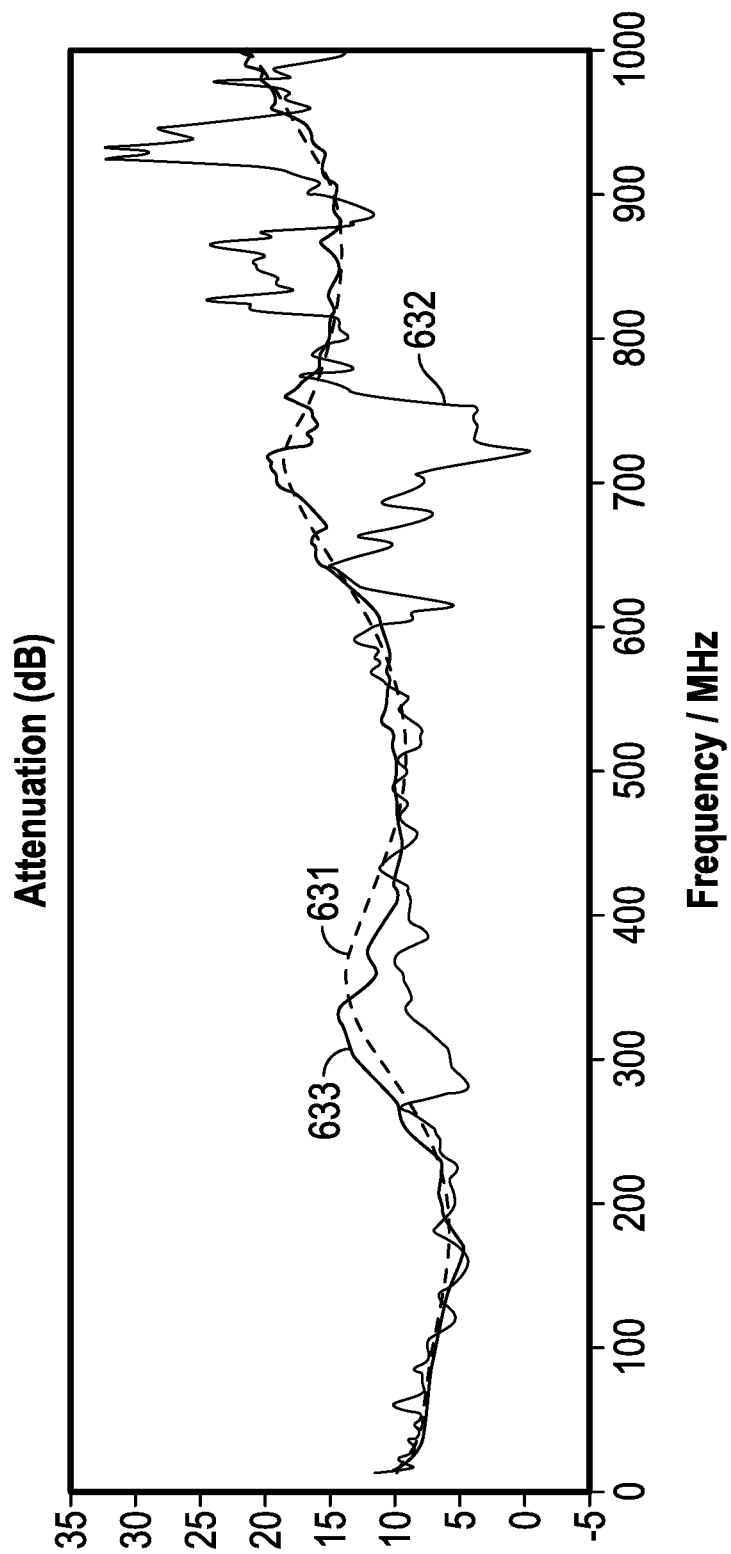
FIG. 6A shows several curves graphically illustrating attenuation with respect to frequency corresponding to measurements for various tools under simulation.

FIG. 6A shows several curves 631-633 graphically illustrating attenuation with respect to frequency corresponding to measurements for various tools under simulation. Curve 631 illustrates the signal for an idealized model with all space between the pad and the mandrel filled with conductive metal. Curve 632 illustrates the signal for a conventional tool. Curve 633 illustrates the signal for a model with the gap between the pad and the mandrel covered by a conductive element of the present disclosure. The tool of the present disclosure is substantially similar to the idealized tool and significantly better than the conventional tool, particularly with respect to high frequency measurements.

Figure 6B:
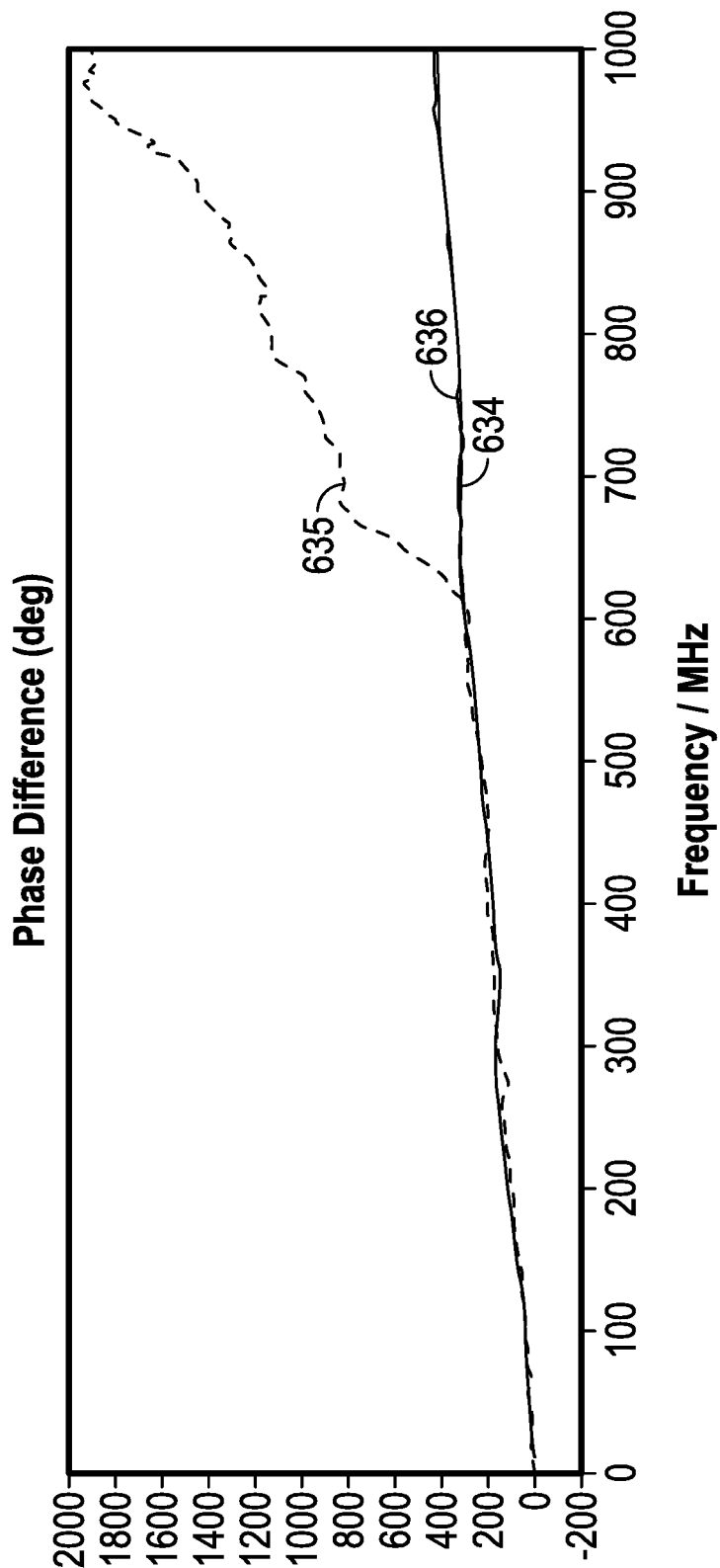
FIG. 6B shows several curves graphically illustrating phase shift with respect to frequency corresponding to measurements for various tools under simulation.

FIG. 6B shows several curves 634-636 graphically illustrating phase shift with respect to frequency corresponding to measurements for various tools under simulation. Curve 634 illustrates the signal for an idealized model with all space between the pad and the mandrel filled with conductive metal. Curve 635 illustrates the signal for a conventional tool. Curve 636 illustrates the signal for a model with the gap between the pad and the mandrel covered by a conductive element of the present disclosure. Phase curve for the idealized tool and the tool of the present disclosure are substantially similar, while phase curve for the conventional tool becomes problematic at frequencies above 600 MHz.

Figure 7:
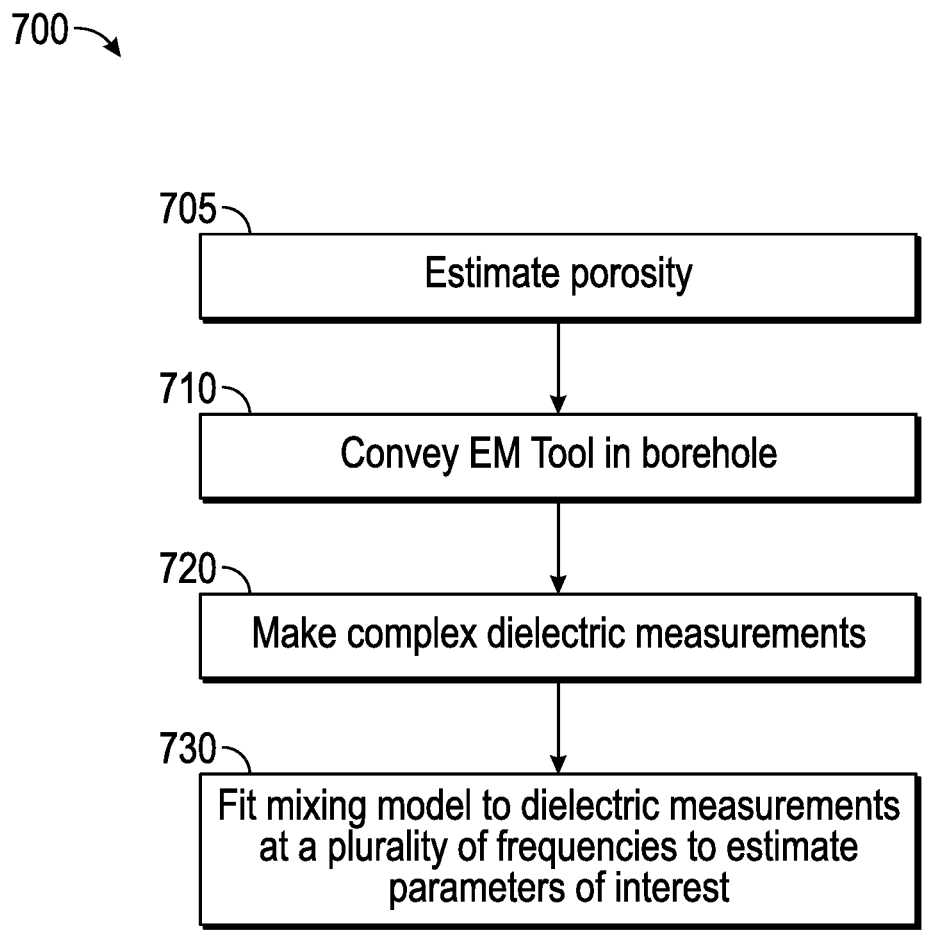
FIG. 7 illustrates a method for evaluating an earth formation using complex dielectric measurements.

FIG. 7 illustrates a method for evaluating an earth formation using complex dielectric measurements. The complex dielectric measurements may be modeled using a selected mixing model approximating the dielectric behavior of the formation. At optional step 705, the method may begin by estimating porosity values of a volume of interest in a borehole proximate the volume of interest of an earth formation. At optional step 710, the method may include conveying an electromagnetic tool in a borehole proximate a volume of interest of an earth formation. Conveying the tool may include conveying the tool on a drillstring by rotating a drillbit on a bottom hole assembly (BHA) at the distal end of the drill string to extend the borehole, tripping the tool on a wireline, and so on. At optional step 720, the method may include making complex dielectric measurements of the volume of interest in the borehole. Step 720 may be carried out by exciting one or more transmitters in the borehole at at least one frequency, which may include a plurality of frequencies, receiving signals at a plurality of receivers responsive to the excitation, and processing the signals to generate measurements. Steps 710 and 720 may be carried out by using at least one processor to direct the carrier or other drilling or borehole equipment, or control the transmitters, either directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., a propagating wave). Making measurements may include estimating a phase shift associated with one or more signals. An inversion may be carried out by inverting for permittivity and conductivity using a wholespace model as an initial guess. In the whole space inversion, first the synthetic tool response in an isotropic whole-space model, i.e., without horizontal or vertical boundaries, is calculated. The synthetic whole-space response is then compared with measured field data at each logging depth and the respective parameter values are adjusted to match the synthetic responses with the measured field responses. In performing the match, other drilling or measurement parameters may also be used as input parameters.

Optional step 730 may include fitting a mixing model to dielectric measurements at a plurality of frequencies to estimate values for parameters of interest of the volume, such as, for example, salinity of the water of the formation, water saturation of the formation, and permittivity of the rock matrix of the formation. This may include performing an inversion.

Other, optional, steps may include evaluating the formation or modeling the formation using the parameters of interest, conducting secondary recovery operations in dependence upon the estimated parameters, the model, a location of a boundary, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest).

Aspects of the present disclosure are subject to application in various different embodiments. In some general embodiments, the carrier is implemented as a tool string of a drilling system, and measurements taken in the borehole may be characterized as "logging-while-drilling" (LWD) or "measurement-while-drilling" (MWD) operations.

Figure 8:
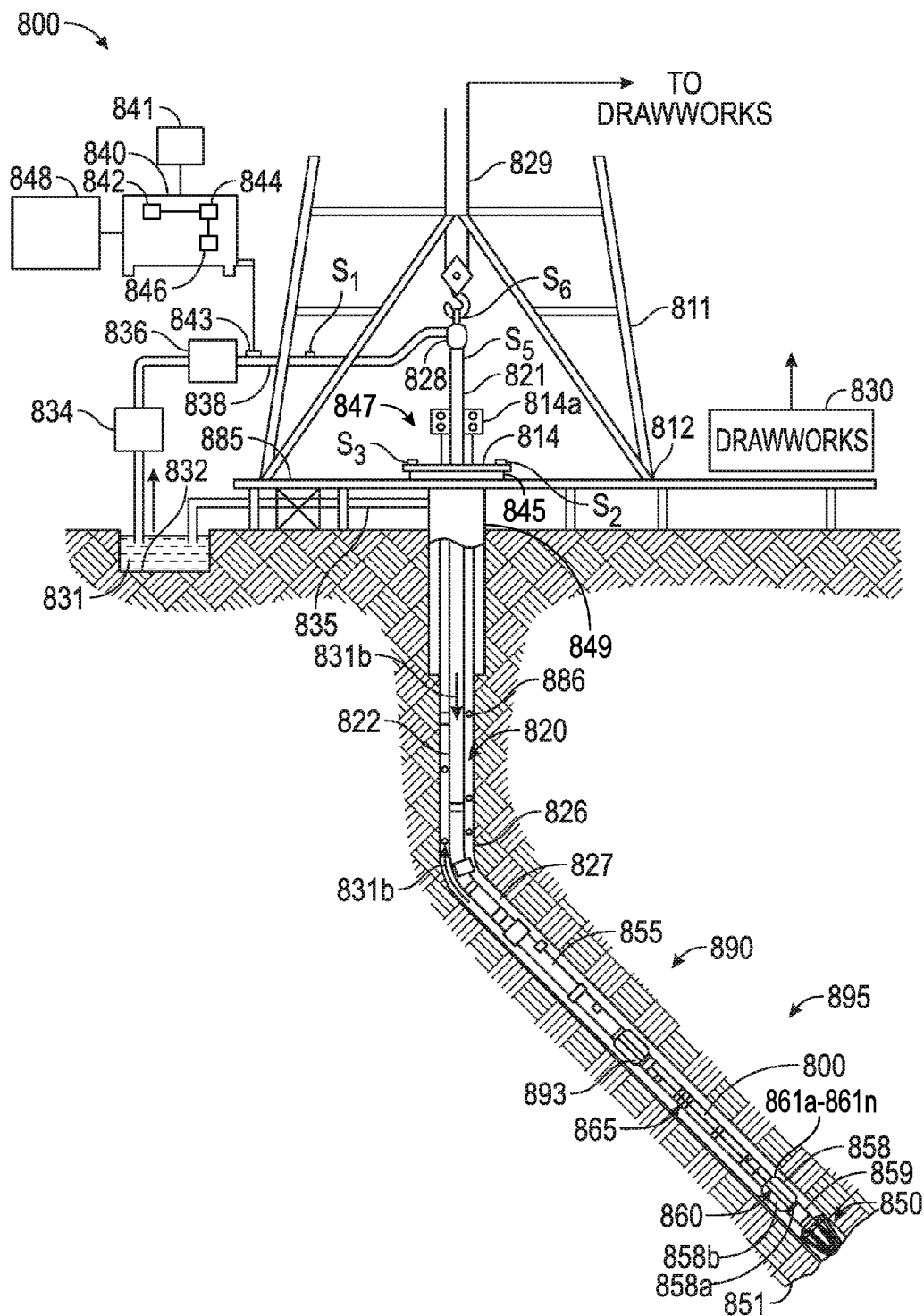
FIG. 8 shows an example embodiment of an MWD system in accordance with embodiments of the present disclosure.

FIG. 8 shows an example embodiment of an MWD system in accordance with embodiments of the present disclosure. The system 801 includes a carrier 811 that is shown disposed in a wellbore or borehole 826 that penetrates at least one earth formation 895. The system 801 also includes a tool 810.

FIG. 8 shows a drill string 820 including a bottomhole assembly (BHA) 890 conveyed in the borehole 826 as the carrier. The drilling system 801 includes a conventional derrick 811 erected on a platform or floor 812 which supports a rotary table 814 that is rotated by a prime mover, such as an electric motor (not shown), at a desired rotational speed. A tubing (such as jointed drill pipe 822), having the drilling assembly 890, attached at its bottom end extends from the surface to the bottom 851 of the borehole 826. A drill bit 850, attached to drilling assembly 890, disintegrates the geological formations when it is rotated to drill the borehole 826. The drill string 820 is coupled to a drawworks 830 via a Kelly joint 821, swivel 828 and line 829 through a pulley. Drawworks 830 is operated to control the weight on bit ("WOB"). The drill string 820 may be rotated by a top drive (not shown) instead of by the prime mover and the rotary table 814. Alternatively, a coiled-tubing may be used as the tubing 822. A tubing injector 814a may be used to convey the coiled-tubing having the drilling assembly attached to its bottom end. The operations of the drawworks 830 and the tubing injector 814a are known in the art and are thus not described in detail herein.

It should be understood that embodiments of the present disclosure are well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc.) refer to the direction of travel along the borehole either toward or away from the surface, with the upward direction being toward the surface and the downward direction being away from the surface.

A suitable drilling fluid 831 (also referred to as the "mud") from a source 832 thereof, such as a mud pit, is circulated under pressure through the drill string 820 by a mud pump 834. The drilling fluid 831 passes from the mud pump 834 into the drill string 820 via a discharger 836 and the fluid line 838. The drilling fluid 831a from the drilling tubular discharges at the borehole bottom 851 through openings in the drill bit 850. The returning drilling fluid 831b circulates uphole through the annular space 827 between the drill string 820 and the borehole 826 and returns to the mud pit 832 via a return line 835 and drill cutting screen 885 that removes the drill cuttings 886 from the returning drilling fluid 831b. A sensor S1 in line 838 provides information about the fluid flow rate. A surface torque sensor S2 and a sensor S3 associated with the drill string 820 respectively provide information about the torque and the rotational speed of the drill string 820. Tubing injection speed is determined from the sensor S5, while the sensor S6 provides the hook load of the drill string 820.

Well control system 847 is placed at the top end of the borehole 826. The well control system 847 includes a surface blow-out-preventer (BOP) stack 815 and a surface choke 849 in communication with a wellbore annulus 827. The surface choke 849 can control the flow of fluid out of the borehole 826 to provide a back pressure as needed to control the well.

In some applications, the drill bit 850 is rotated by only rotating the drill pipe 822. However, in many other applications, a downhole motor 855 (mud motor) disposed in the BHA 890 also rotates the drill bit 850. The rate of penetration (ROP) for a given BHA largely depends on the WOB or the thrust force on the drill bit 850 and its rotational speed.

A surface control unit or controller 840 receives signals from the downhole sensors and devices via a sensor 843 placed in the fluid line 838 and signals from sensors S1-S6 and other sensors used in the system 801 and processes such signals according to programmed instructions provided to the surface control unit 840. The surface control unit 840 displays drilling parameters and other parameters of interest related to the borehole, formation, and drilling operations, and other information on a display/monitor 841 that is utilized by an operator to control the drilling operations. The surface control unit 840 may be a computer-based unit that may include a processor 842 (such as a microprocessor), a storage device 844, such as a solid-state memory, tape or hard disc, and one or more computer programs 846 in the storage device 844 that are accessible to the processor 842 for executing instructions contained in such programs. The surface control unit 840 may further communicate with a remote control unit 848. The surface control unit 840 may process data relating to the drilling operations, data from the sensors and devices on the surface, and data received from downhole; and may control one or more operations of the downhole and surface devices. The data may be transmitted in analog or digital form.

The BHA 890 may include a tool 810 configured for EM well logging as described above. The BHA 890 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 895 surrounding the BHA 850. For convenience, all such sensors are generally denoted herein by numeral 865. The BHA 890 may further include a variety of other sensors and devices 859 for determining one or more properties of the BHA 890, such as vibration, bending moment, acceleration, oscillations, whirl, stick-slip, weight-on-bit, fluid flow rate, pressure, temperature, rate of penetration, azimuth, tool face, drill bit rotation, etc.

The BHA 890 may include a steering apparatus or tool 858 for steering the drill bit 850 along a desired drilling path. In one aspect, the steering apparatus may include a steering unit 860, having a number of force application members 861a-861n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 858 having a bent sub and a first steering device 858a to orient the bent sub in the wellbore and the second steering device 858b to maintain the bent sub along a selected drilling direction. The steering unit 858, 860 may include near-bit inclinometers and magnetometers.

The drilling system 801 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 820 to provide the required force on the drill bit.

Example sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 801 can include one or more downhole processors at a suitable location such as 893 on the BHA 890. The processor(s) can be a microprocessor that uses a computer program implemented on a suitable non-transitory computer-readable medium that enables the processor to perform the control of system 801 and processing of information, such as information from the sensors. The non-transitory computer-readable medium may include one or more ROMs, EPROMs, EAROMs, EEPROMs, flash memories, RAMs, hard drives and/or optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 842 can process at the surface measured data, along with the data transmitted from the downhole processor, to evaluate the formation.

Surface processor 842 or downhole processor 893 may also be configured to control steering apparatus 858, mud pump 834, drawworks 830, rotary table 814, downhole motor 855, other components of the BHA 890, or other components of the drilling system 801. Surface processor 842 or downhole processor 893 may be configured to control EM well logging instruments as described above and to estimate a parameter of interest according to methods described herein.

Control of these components may be carried out using one or more models using methods described below. For example, surface processor 842 or downhole processor 893 may be configured to modify drilling operations i) autonomously upon triggering conditions, ii) in response to operator commands, or iii) combinations of these. Such modifications may include changing drilling parameters, steering the drillbit (e.g., geosteering), altering the drilling fluid program, activating well control measures, and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 842, downhole processor 893, or other processors (e.g. remote processors) may be configured to operate the EM well logging tool.

The system 801 may include any number of downhole tools for various processes including formation drilling, geosteering, and formation evaluation (FE) for making electrical measurements versus depth and/or time of one or more physical properties in or around a borehole, including a volume of interest of the formation intersected by the borehole.

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Implicit in the processing of data is the use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of a resistivity property or permittivity, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

As used above, a processor is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

"Substantially different" as used herein means not substantially the same. "Substantially the same," or "substantially similar" as used herein means a value consistent with a general formation structure or feature, or having a value within a common statistical deviation, such as within one standard deviation, within 5 percent, within 1 percent of a moving average and so on. Substantially the same refers to values within the generally held value for common deviation, such as, for example, due to noise.

The term "pad," as used herein, refers to that part of a logging tool that engaged with the borehole wall and holds sensors (e.g. an antenna assembly according to embodiments of this disclosure) to measure the parameter of interest of the earth formation. The pad may be extended from the tool body on an arm or may be otherwise extended from the tool body.

As described herein, "complex permittivity" refers to a permittivity having a real part, which is commonly called the dielectric constant, and an imaginary part, which is commonly called the dielectric loss factor or loss tangent.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

What is claimed is:

1. An electromagnetic (EM) well logging apparatus for investigating a formation from a fluid-filled borehole intersecting the formation, the apparatus comprising:
   a carrier body having a pocket formed in an outer surface, the pocket being defined by a plurality of walls and a bottom;

a pad configured to emit EM energy, the pad having an outer face, a plurality of sides complementary to the plurality of walls, and an inner face positioned adjacent to the bottom, wherein the pad is movably disposed in the pocket such that a gap separates at least one wall of the plurality of walls and at least one side of the plurality of sides;

at least one electrically conductive member forming an electrical connection between the carrier body and the pad and covering the gap.

2. The apparatus of claim 1, the apparatus further comprising:
circuitry configured to generate measurement signals responsive to emitted EM energy from the pad;
wherein the gap has sufficient dimensions to produce resonant parasitic electromagnetic signals in the measurement signals from capacitive coupling between the carrier body and the pad, and the at least one electrically conductive member mitigates the capacitive coupling.

3. The apparatus of claim 2, the capacitive coupling is sufficiently mitigated such that the measurement signals are substantially free of resonant parasitic electromagnetic signals.

4. The apparatus of claim 1, wherein the pad is slideably disposed in the pocket.

5. The apparatus of claim 1, wherein at least a portion of the at least one electrically conductive member bridges the gap where capacitive coupling between the body and the pad substantially affects the measurement signals.

6. The apparatus of claim 1, wherein the electrical connection is formed by sliding galvanic contact between the at least one electrically conductive member and at least one of: i) the at least one wall; and ii) the at least one side.

7. The apparatus of claim 1, wherein the at least one electrically conductive member maintains the electrical connection while permitting translational motion of the pad in six degrees of freedom.

8. The apparatus of claim 1, wherein the electrically conductive member covers a majority of the gap.

9. The apparatus of claim 1, wherein the at least one electrically conductive member is a flexible conductive strip.

10. The apparatus of claim 1, wherein a first gap separates a first wall of the plurality of walls and a first side of the plurality of sides, a second gap separates a second wall of the plurality of walls and a second side of the plurality of sides, and the least one electrically conductive member includes a first member covers the first gap and a second member covers the second gap.

11. The apparatus of claim 1, wherein the fluid filling the borehole has a resistivity significantly greater than the electrically conductive member.

12. The apparatus of claim 1, wherein the electrically conductive member is a resilient member configured to apply a spring force to the pad.

13. The apparatus of claim 1, where the electrically conductive member is configured to frictionally engage at least one of: (i) the carrier body, and (ii) the pad.

14. The apparatus of claim 1, wherein the tool is configured to radially extend the pad toward a wall of the borehole.

15. The apparatus of claim 1, wherein dimensions of the gap vary during operation of the apparatus.

* * * * *